(12) United States Patent
Kalev

(10) Patent No.: US 9,077,211 B2
(45) Date of Patent: Jul. 7, 2015

(54) ELECTROMECHANICAL FLYWHEEL WITH EVACUATION SYSTEM

(71) Applicant: Claude Michael Kalev, Newbury Park, CA (US)

(72) Inventor: Claude Michael Kalev, Newbury Park, CA (US)

( * ) Notice: Subject to any disclaimer, the term of this patent is extended or adjusted under 35 U.S.C. 154(b) by 514 days.

(21) Appl. No.: 13/849,484

(22) Filed: Mar. 23, 2013

(65) Prior Publication Data

US 2013/0264914 A1 Oct. 10, 2013

Related U.S. Application Data

(60) Provisional application No. 61/615,860, filed on Mar. 26, 2012.

(51) Int. Cl.
*H02K 7/02* (2006.01)

(52) U.S. Cl.
CPC .................. *H02K 7/025* (2013.01); *Y02E 60/16* (2013.01); *H02K 2205/12* (2013.01)

(58) Field of Classification Search
USPC ......... 310/68 B, 68 C, 74, 113, 88–89, 62–63
See application file for complete search history.

(56) References Cited

U.S. PATENT DOCUMENTS

| | | | |
|---|---|---|---|
| 5,462,402 A | 10/1995 | Bakholdin et al. | |
| 5,559,381 A | 9/1996 | Bosley et al. | |
| 5,566,588 A | 10/1996 | Bakholdin et al. | |
| 5,568,023 A | 10/1996 | Grayer et al. | |
| 5,614,777 A * | 3/1997 | Bitterly et al. | 310/74 |
| 5,628,232 A | 5/1997 | Bakholdin et al. | |
| 5,708,312 A | 1/1998 | Rosen et al. | |
| 5,767,595 A | 6/1998 | Rosen | |
| 5,770,909 A | 6/1998 | Rosen et al. | |
| 5,864,303 A * | 1/1999 | Rosen et al. | 340/870.37 |
| 5,998,899 A * | 12/1999 | Rosen et al. | 310/90.5 |
| 6,144,128 A | 11/2000 | Rosen | |
| 6,175,172 B1 | 1/2001 | Bakholdin et al. | |
| 6,202,498 B1 | 3/2001 | Schlenker | |
| 6,585,490 B1 * | 7/2003 | Gabrys et al. | 417/51 |
| 6,653,757 B2 | 11/2003 | Schlenker | |
| 6,787,933 B2 | 9/2004 | Claude et al. | |
| 6,812,587 B2 | 11/2004 | Gilbreth et al. | |
| 6,882,072 B2 * | 4/2005 | Wingett et al. | 310/74 |
| 6,884,039 B2 | 4/2005 | Woodard et al. | |
| 6,995,529 B2 * | 2/2006 | Sibley | 318/161 |
| 7,053,589 B2 | 5/2006 | Gabrys et al. | |
| 7,078,876 B2 | 7/2006 | Hofmann et al. | |
| 7,082,809 B2 | 8/2006 | Balasu | |
| 7,109,622 B2 | 9/2006 | Khalizadeh | |
| 7,170,255 B2 | 1/2007 | Hofmann et al. | |
| 7,187,087 B2 | 3/2007 | Khalizadeh | |
| 7,489,100 B2 | 2/2009 | Hofmann et al. | |
| 7,633,172 B2 | 12/2009 | Kalev et al. | |
| 7,741,795 B2 | 6/2010 | Kalev | |
| 7,855,465 B2 | 12/2010 | Kalev et al. | |

(Continued)

FOREIGN PATENT DOCUMENTS

RU 100861 U1 12/2010

*Primary Examiner* — Thanh Lam
(74) *Attorney, Agent, or Firm* — Paul D. Chancellor; Ocean Law

(57) ABSTRACT

An electromechanical flywheel machine includes a flywheel mass enclosed in an evacuable housing and an external gas removal train.

8 Claims, 13 Drawing Sheets

(56) References Cited

U.S. PATENT DOCUMENTS

| | | |
|---|---|---|
| 8,030,787 B2 | 10/2011 | Kalev |
| 2002/0158530 A1* | 10/2002 | Gennesseaux ............... 310/112 |
| 2003/0175126 A1 | 9/2003 | Woodard et al. |
| 2006/0038453 A1* | 2/2006 | Khalizadeh ................ 310/90.5 |
| 2009/0134705 A1 | 5/2009 | Kalev |
| 2009/0282822 A1* | 11/2009 | McBride et al. ............... 60/415 |
| 2012/0031224 A1 | 2/2012 | Tarrant |
| 2013/0078112 A1* | 3/2013 | McIver ........................ 417/48 |

* cited by examiner

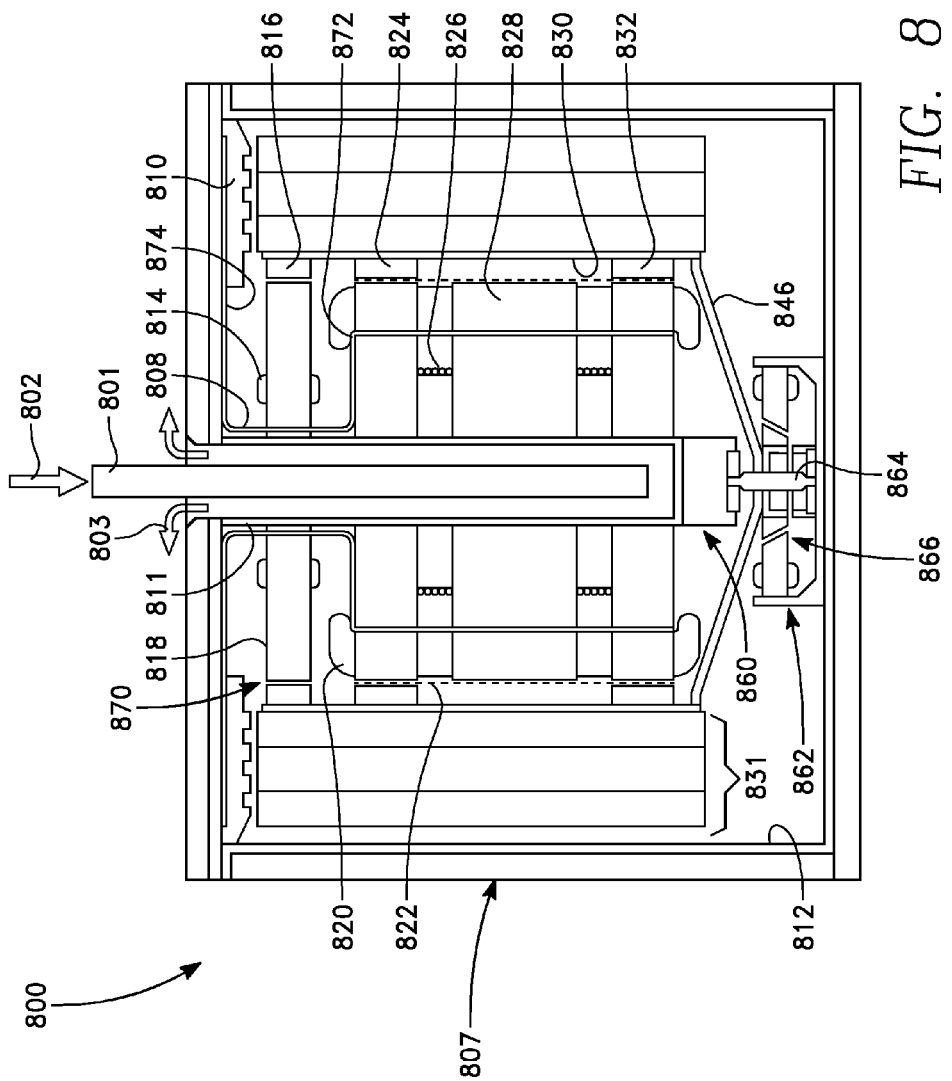

ELECTROMECHANICAL FLYWHEEL WITH EVACUATION SYSTEM

PRIORITY CLAIM AND INCORPORATION BY REFERENCE

This application claims the benefit of Prov. Pat. App. No. 61/615,860 filed Mar. 26, 2012.

This application incorporates by reference, in their entireties including teaching relating to evacuation systems and methods, and for all purposes: 1) U.S. Prov. Pat. App. No. 61/615,860 filed Mar. 26, 2012; 2) U.S. Pat. No. 6,884,039 to Woodard et al. filed Dec. 30, 2002; and 3) U.S. Pat. No. 6,175,172 to Bakholdin et al. filed Aug. 4, 1997.

BACKGROUND OF THE INVENTION

Known flywheels store kinetic energy, that is, the energy of motion. When called upon to release this energy, the flywheel slows as kinetic energy is depleted. Flywheels driving and driven by electric machines are also know. For decades, such electromechanical machines have been built and have achieved varying degrees of operational success. Widespread application has, however, eluded flywheel manufacturers as even the most advanced commercial machines suffer from significant operational limitations while exceeding the cost of better performing alternatives. Despite persistent efforts by a small flywheel manufacturing industry, modern electromechanical flywheels have found only narrow applications in a few niche markets and presently make no significant contribution to the developed world's energy supply.

FIELD OF INVENTION

This invention relates to the electromechanical arts. In particular, an electromechanical flywheel includes an evacuation system for evacuating a flywheel mass enclosure.

DISCUSSION OF THE RELATED ART

Electromechanical flywheels include machines operating under atmospheric conditions and machines operating under evacuated conditions. However, prior art vacuum systems have generally failed to establish and maintain desired vacuum conditions.

SUMMARY OF THE INVENTION

The present invention provides an electromechanical flywheel with an evacuation system.

In some embodiments, the electromechanical flywheel with an evacuation system includes; a flywheel mass inside an evacuable housing; a gas removal train external to the evacuable housing; the train including a mechanical vacuum pump and a non-mechanical gas removal device; getter material and molecular sieve material in a casing of the gas removal device; the train operable to fluidly couple the casing and the evacuable housing for lowering the pressure in the evacuable housing; a pressure sensor configured to sense the pressure in the evacuable housing; and, the mechanical pump configured to operate intermittently in accordance with differences between a pressure sensed by the pressure sensor and a threshold vacuum pressure level.

And, in some embodiments, the electromechanical flywheel with an evacuation system includes: a core assembly including a motor-generator stator; a motor-generator rotor surrounding the stator; the stator defining an axis of rotation, having a field coil that encircles the axis of rotation, and having an armature coil that does not encircle the axis of rotation; a flywheel mass encircles the rotor and is coupled to the rotor for rotation with the rotor; and, an evacuable housing that encloses the flywheel mass.

BRIEF DESCRIPTION OF THE DRAWINGS

The present invention is described with reference to the accompanying figures. These figures, incorporated herein and forming part of the specification, illustrate the present invention and, together with the description, further serve to explain the principles of the invention and to enable a person skilled in the relevant art to make and use the invention.

FIG. 8 shows a fourth embodiment of the electromechanical flywheel machine of FIG. 1.

DETAILED DESCRIPTION OF THE PREFERRED EMBODIMENTS

The disclosure provided in the following pages describes examples of some embodiments of the invention. The designs, figures, and descriptions are non-limiting examples of certain embodiments of the invention. For example, other embodiments of the disclosed device may or may not include the features described herein. Moreover, disclosed advantages and benefits may apply to only certain embodiments of the invention and should not be used to limit the disclosed inventions.

Figure 1:
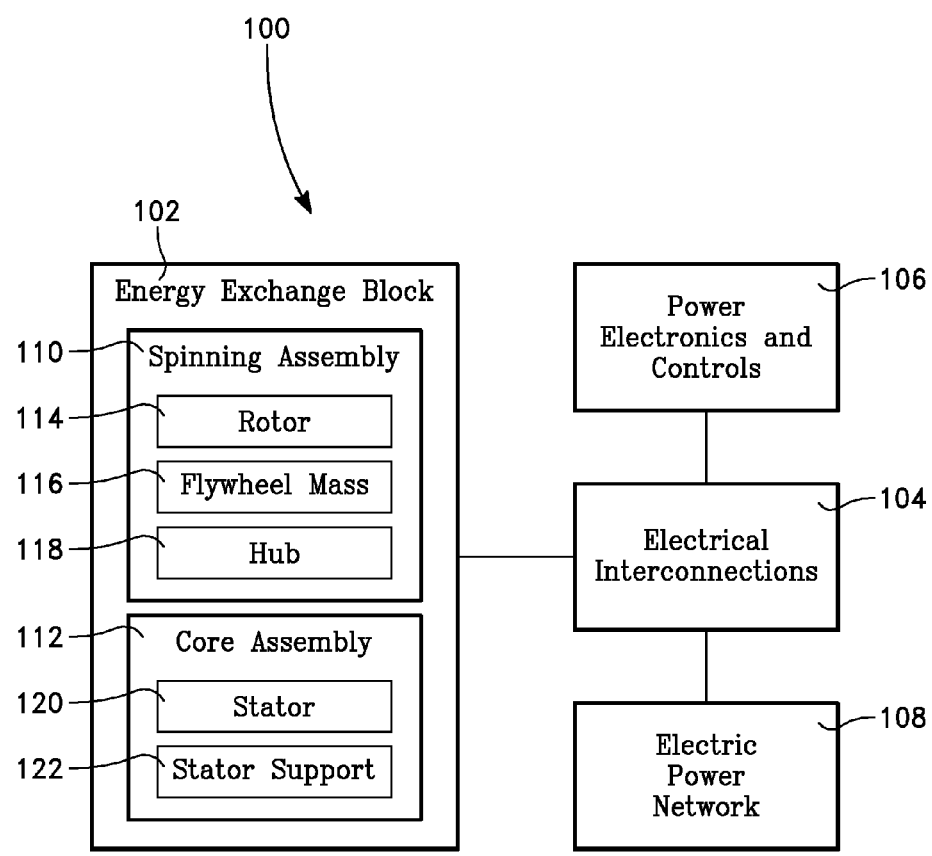
FIG. 1 shows a block diagram of an electromechanical flywheel machine in accordance with the present invention.

FIG. 1 shows an electromechanical flywheel machine 100. Electrical interconnections 104 electrically couple an energy exchange block 102, power electronics and controls 106, and an electric power network 108.

As used herein, unless otherwise stated, the term coupled refers to a direct or indirect connection such as 1) A connected directly to B and 2) C connected indirectly to E via D.

The energy exchange block 102 includes a spinning assembly 110 and a core assembly 112. The spinning assembly includes a motor-generator rotor 114, a flywheel mass 116, and a hub 118. The core assembly includes a motor-generator stator 120 and a motor-generator stator support 122. In various embodiments, the rotor is shaft-less. And, in various embodiments, the spinning assembly is shaft-less.

Electrical interconnections 104 include any of electrical conductor connections, electrical interface devices, electrical transducers, and the like. Power electronics and controls 106 include any of silicon and/or semiconductor devices, analog and digital processors, and related interfaces including human interfaces. The electric power network 108 is 1) a source of electric power to the energy exchange block 102 in some embodiments, 2) a user of electric power from the energy exchange block in some embodiments, and 3) both a source and a user of electric power to and from the energy exchange block in some embodiments.

Figure 2:
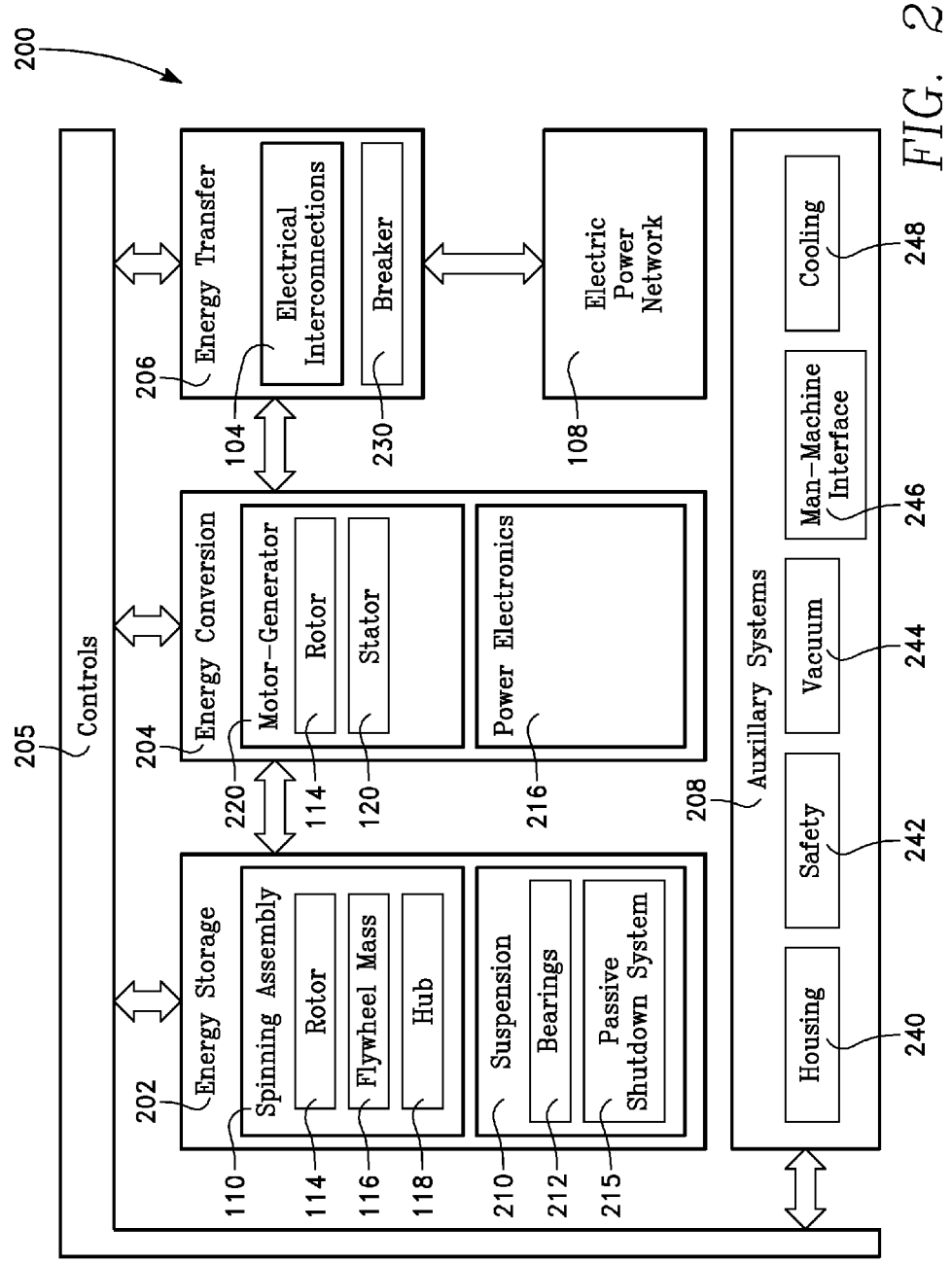
FIG. 2 shows selected functions and equipment of the electromechanical flywheel machine of FIG. 1.

FIG. 2 shows selected electromechanical flywheel machine functions and equipment 200. Energy storage 202 is central to flywheel operation. In electromechanical flywheels, energy storage and energy conversion 204 provide a means for converting kinetic energy to electrical power and/or converting electrical power to kinetic energy. Energy transfer 206 provides for electric power transfers between energy conversion equipment 220, 216 and an electric power network 108. In various embodiments, an electrical switch such a circuit breaker 230 provides for connecting and disconnecting conductors enabling power transfer. In various embodiments, other electromechanical flywheel machine functions include any of several auxiliary support functions 208 described below.

Energy storage 202 utilizes the spinning assembly 110. In various embodiments, a suspension system 210 supports the spinning assembly. Suspension equipment includes bearings or their equivalents 212 and in some embodiments a passive shutdown system 215 supports the spinning assembly in selected operating regimes such as shutdown.

Energy conversion 204 utilizes a means for converting kinetic energy into electrical power such as a generator or a motor-generator. A motor-generator 220 is shown. The motor-generator includes the rotor 114 and a stator 120 and provides a means for rotatably driving the spinning assembly 110 and for being rotatably driven by the spinning assembly. In various embodiments, power electronics 216 enable manipulation of electrical waveforms emanating from the motor-generator and/or the electric power network 108. For example, in various embodiments, power electronics provide for frequency conversion in an AC to AC converter having an intermediate DC bus and power electronics provide for variable speed drive functions such as accelerating the rotational speed of the flywheel rotor.

In various embodiments, auxiliary support functions 208 are carried out by auxiliary support equipment described more fully below. Auxiliary support functions include housing 240, safety 242, vacuum 244, cooling 248, and man-machine interface 246.

A control function 205 provides for one or more of monitoring, assessment, command, and control of other electromechanical flywheel functions. In particular, the control function enables electromechanical flywheel operation via supervision and/or control of one or more of the energy storage 202, energy conversion 204, energy transfer 206, and auxiliary support 208 functions.

Figure 3:
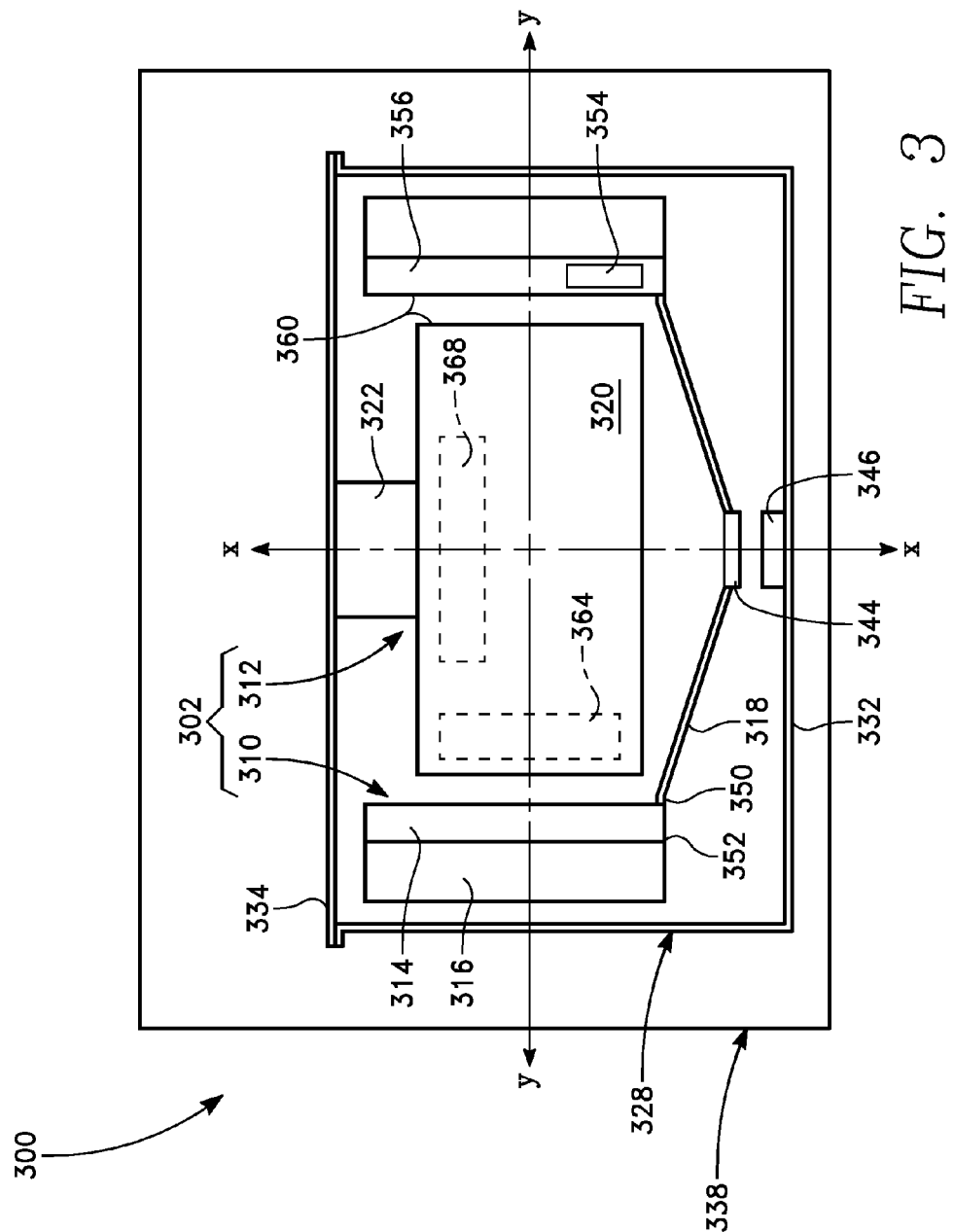
FIG. 3 shows a first embodiment of the electromechanical flywheel machine of FIG. 1.

FIG. 3 shows a first electromechanical flywheel portion 300. An energy exchange block 302 is enclosed by an inner housing 328 which is in turn enclosed by an optional outer housing 338.

The energy exchange block 302 includes a spinning assembly 310 and a core assembly 312. Included in the spinning assembly is a motor-generator rotor 314 and a flywheel mass encircling and coupled to the rotor 316, a hub 318 coupled to the flywheel mass, and a moving suspension element 344. In some embodiments, a sleeve such as a non-magnetic sleeve (e.g., non-magnetic metal alloys and super-alloys) is interposed between the rotor and the flywheel mass for, inter alia, backing the rotor and providing support to the rotor. The rotor, flywheel mass, hub, and moving suspension element are for rotation in synchrony about an axis x-x and in various embodiments the hub is attached to one or both of the rotor 350 and the flywheel mass 352. Opposite the moving suspension element is a stationery suspension element 346 with a support such as a first wall of the inner housing 332. Included in the core assembly 312 are a stator 320 and a stator support 322. In some embodiments the stator support is coupled to a wall of the inner housing such as a second wall of the inner housing 334.

Encircling the motor-generator stator 320 is the motor-generator rotor 314. In various embodiments, the rotor 314 includes magnetic 354 and nonmagnetic 356 portions and, in some embodiments, the nonmagnetic portion is or includes blocking or matrix material supporting the magnetic portions. In an embodiment, the magnetic rotor portions are laminated structures.

In various embodiments the stator 320 includes a magnetic structure with one or more interengaged coils having electrically conductive windings capable of carrying variable currents and thereby varying the magnetic flux of the magnetic structure. In some embodiments, a first stator coil 364 encircles an imaginary y-y axis that is about perpendicular to the x-x axis. And, in some embodiments, a second stator coil 368 encircles the x-x axis. In an embodiment, a plurality of first stator coils encircle respective imaginary y-y axes and one or more second stator coils encircle the x-x axis, the first stator coils being armature coils and the second stator coils being field coils.

And, in an embodiment, the motor-generator 360 is a homopolar electric machine with the illustrated inside-out arrangement (rotor encircles stator) wherein a) a rotatable rotor similar to rotor 314 includes coil-less, laminated magnetic structures, b) wherein a stationery central stator similar to stator 320 includes laminated magnetic structures with coils for creating a magnetic flux in the magnetic structures and c) the rotor encircles the stator.

Figure 4A:
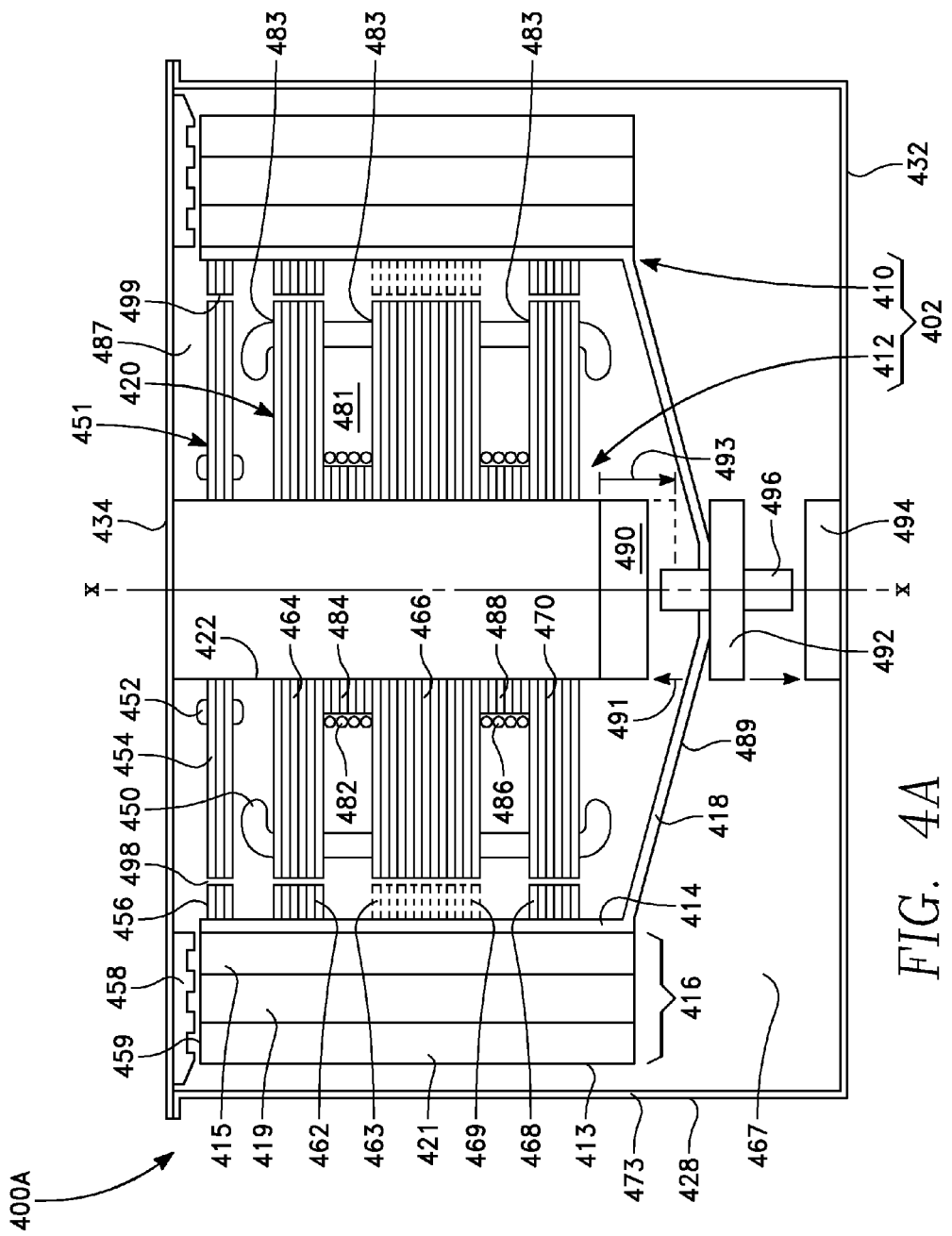
FIG. 4A shows a second embodiment of the electromechanical flywheel machine of FIG. 1.

FIG. 4A shows a second electromechanical flywheel portion 400A. An energy exchange block 402 is enclosed by an inner housing 428 which is enclosed, or partially enclosed, in some embodiments, by an outer housing (not shown).

The energy exchange block 402 includes a spinning assembly 410 and a core assembly 412. Included in the spinning assembly are a motor-generator rotor 414, a flywheel mass encircling and coupled to the rotor 416, a hub coupled to the flywheel mass 418, a support pin for supporting the hub 496, and a moving suspension assembly for supporting the hub 492. Some embodiments include a sleeve such as a non-magnetic sleeve between the rotor and the flywheel mass.

In various embodiments, the flywheel mass 416 includes layers of different materials such as fiberglass in one or more types or grades and carbon fiber in one or more types or grades. U.S. Pat. No. 6,175,172 filed Aug. 4, 1997 and entitled HUB AND CYLINDER DESIGN FOR FLYWHEEL SYSTEM FOR MOBILE ENERGY STORAGE provides additional information about flywheel mass materials of construction.

U.S. Pat. No. 6,175,172 filed Aug. 4, 1997 and entitled HUB AND CYLINDER DESIGN FOR FLYWHEEL SYSTEM FOR MOBILE ENERGY STORAGE provides additional information about flywheel mass construction techniques and materials shown in FIG. 4A and the related description. This patent is incorporated in its entirety and for all purposes.

As shown, the flywheel mass includes three layers with a first layer 415 adjacent to the rotor, an intermediate layer 419, and an outer layer 421. In an embodiment, the intermediate and outer layers include carbon fiber materials and the inner layer includes fiberglass. In another embodiment, all three layers are substantially made from carbon fiber materials. In various embodiments, one or more layers are pre-stressed such as by winding fibers under tension to form substantially cylindrical shell(s) with inherent compressive stress.

The support pin, moving suspension assembly and hub are concentrically arranged and are for rotation in synchrony about an axis x-x. As seen, the support pin 496 is located in a gap 491 between upper and lower bearing carriers 490, 494. Extending from the stator support 422 is an upper bearing carrier and supported from a first wall of the housing 432 is a lower bearing carrier. In an embodiment, elongation of the upper bearing carrier along the x-x axis 493 serves to rotatably restrain the support pin between the upper and lower bearing carriers. In this sense, the upper and lower bearing carriers provide a means to "capture" the spinning assembly 410 via the support pin and are useful for functions including passive shutdown. In various embodiments, the lower bearing carrier and the moving suspension assembly incorporate a first electromagnetic bearing.

A second electromagnetic bearing 451 is spaced apart from the upper and lower bearing carriers 490, 494. The second electromagnetic bearing includes a fixed bearing stator 454 supported by the stator support 422 and electrical windings 452 for magnetizing the stator and a geometrically opposing rotor 456 coupled to the rotor. As shown, the mating faces of the electromagnet 498, 499 are parallel to the x-x axis such that electromagnetic bearing forces are perpendicular to the x-x axis. In other embodiments, angled electromagnetic bearing faces such as those described infra provide electromagnetic bearing force components along an axis parallel to the x-x axis and along an axis perpendicular to the x-x axis.

Included in the core assembly 412 is a stator 420 and a stator support 422 coupled to a second wall of the inner housing 434. Encircling the motor-generator stator is the motor-generator rotor 414. In various embodiments, the rotor includes magnetic and nonmagnetic portions (e.g., see 354, 356 of FIG. 3) and, in some embodiments, the nonmagnetic portion is or includes blocking or matrix material supporting the magnetic portions. In an embodiment, the magnetic rotor portions are laminated structures.

In various embodiments, the stator 420 includes a magnetic structure with one or more interengaged coils having electrically conductive windings capable of carrying variable currents and thereby varying the magnetic flux of the magnetic structure.

In an embodiment, a stator such as a homopolar stator includes at least two peripheral rims and one smaller intermediate rim. The rims include a magnetic material such as iron and in various embodiments the rims are laminated structures with each laminate having a substantially annular shape.

As shown, the stator 420 includes three large diameter rims 464, 466, 470 and two smaller diameter rims 484, 488 such that substantially annular or somewhat doughnut shaped pockets 481 are formed between the large diameter and the small diameter rims. It is in these pockets that coils encircling the rotational axis x-x are placed to form field windings 482, 486. In addition to the field coil(s), the stator also includes armature coils.

Armature coils 450 are interengaged with slots 483 in the periphery of the large rims 464, 466, 470 such that each armature coil will encircle an imaginary axis y-y that is substantially perpendicular to the axis of rotation x-x (see FIG. 3).

For each stator rim, there is a plurality of mating rotor poles. As can be seen, the peripheral stator rims 464, 470 have axially spaced (x-x) mating rotor pole 462, 468 (shown in solid lines) and the central stator rim 466 has axially adjacent mating rotor poles 463, 469 (shown in broken lines). Rotor poles for adjacent rims (e.g., 462, 463) are not only axially spaced (x-x), but they are also radially spaced such that a rotor pole for one rim is radially spaced by 90 electrical degrees from the closest rotor pole mating with an adjacent rim.

In various embodiments, internal vacuum pumps such as molecular drag pumps provide for moving molecules away from the flywheel mass 416 and especially away from the flywheel mass periphery where the highest speeds are achieved. U.S. Pat. No. 5,462,402 FLYWHEEL WITH MOLECULAR PUMP is incorporated by reference herein in its entirety and for all purposes including its discussion of molecular drag pumps and their use in flywheel systems.

In an embodiment, a first vacuum pump is formed by a first stationary labyrinth like ring 458 supported from the housing wall 434 which is closely spaced with respect to a vacuum pump surface of the flywheel mass 459. In various embodiments grooves in the labyrinth ring provide for a pumping action in concert with the moving flywheel surface. In some embodiments, the groove is a spiral and in some embodiments the groove has a cross-sectional area that generally decreases along a forward flow path.

And, in some embodiments, a second drag pump is formed by a labyrinth ring and a moving surface at a periphery of the flywheel mass 413; for example, a labyrinth located on or integral with the housing 428 and a periphery of the flywheel mass operating in close proximity to the labyrinth and establishing an evacuating flow in a direction about perpendicular to the direction of flow established by the first drag pump (peripheral labyrinth not shown). In various embodiments, such an alternative second drag pump is operable with the first drag pump to provide a two-stage drag pump.

In an embodiment, a supply region 467 and an exhaust region 487 are included within the vacuum barrier housing 428. The supply region has a boundary defined at least in part by portions of a vacuum barrier housing, a hub exterior surface 417, and a flywheel mass periphery 413. The exhaust region has a boundary defined at least in part by portions of the vacuum barrier housing and the core assembly 412.

In various embodiments, drag pump(s) include one or both of a) a first drag pump interposed between a first drag pump surface of the flywheel mass 459 and the second vacuum barrier housing wall 434 and b) a second drag pump interposed between a second drag pump surface of the flywheel mass 413 and a third vacuum housing wall 473 that is about perpendicular to the second vacuum housing wall. This first drag pump can be referred to as a radial drag pump and the second drag pump can be referred to as an outer axial drag pump.

Figure 4B:
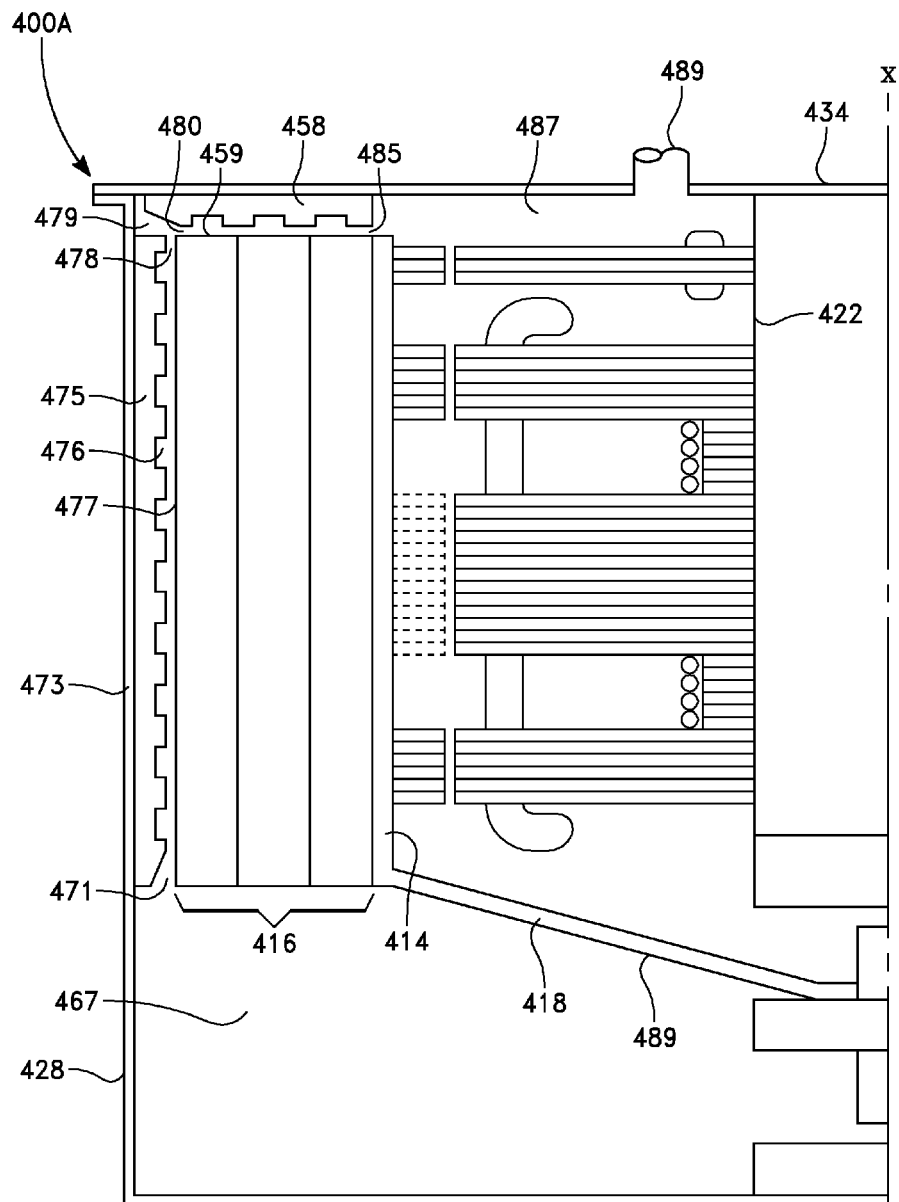
FIG. 4B shows a third embodiment of the electromechanical flywheel machine of FIG. 1.

FIG. 4B shows a second drag pump utilizing a flywheel mass periphery 400B. Here, the second vacuum pump is formed by a second stationary labyrinth ring 475 and a rotatable flywheel peripheral surface 477. The labyrinth ring is coupled to a third housing wall 473. Grooves in the labyrinth ring 476 are similar to those described above. In operation, the flywheel mass peripheral surface moves relative to the labyrinth ring and urges flow in a direction about perpendicular to the direction of flow of the first drag pump.

Multiple drag pumps can operate in parallel between a common supply and exhaust region. They can also be operated in series with one pump's exhaust in fluid communication with another pump's inlet. In the case of a multi-stage drag pump arrangement, flow travels from the second drag pump to the first drag pump. Here, gas in the supply region 467 enters a second pump intake 471 and travels to the second pump exhaust 478. The second pump exhaust and the first pump inlet are fluidly coupled, for example by an interpump space such as a somewhat annular space in an upper corner of the vacuum housing 479. Gas enters the first drag pump inlet 480 from the interpump space and travels to the first drag pump exit 485 where it empties into the exhaust region 487.

In some embodiments, a third vacuum pump is formed by a labyrinth similar to the one described above and fixed to peripheral stator parts (such as the large diameter stator rings 454, 464, 466, 470, not shown for clarity) or fixed to geometrically opposed rotor poles (456, 462, 463, 469, 468). This third drag pump can be referred to as an inner axial drag pump. See for example the drag pump 822 of FIG. 8. In various embodiments, combinations of the first, second, and third drag pumps are used in serial and parallel operation.

Figure 5A:
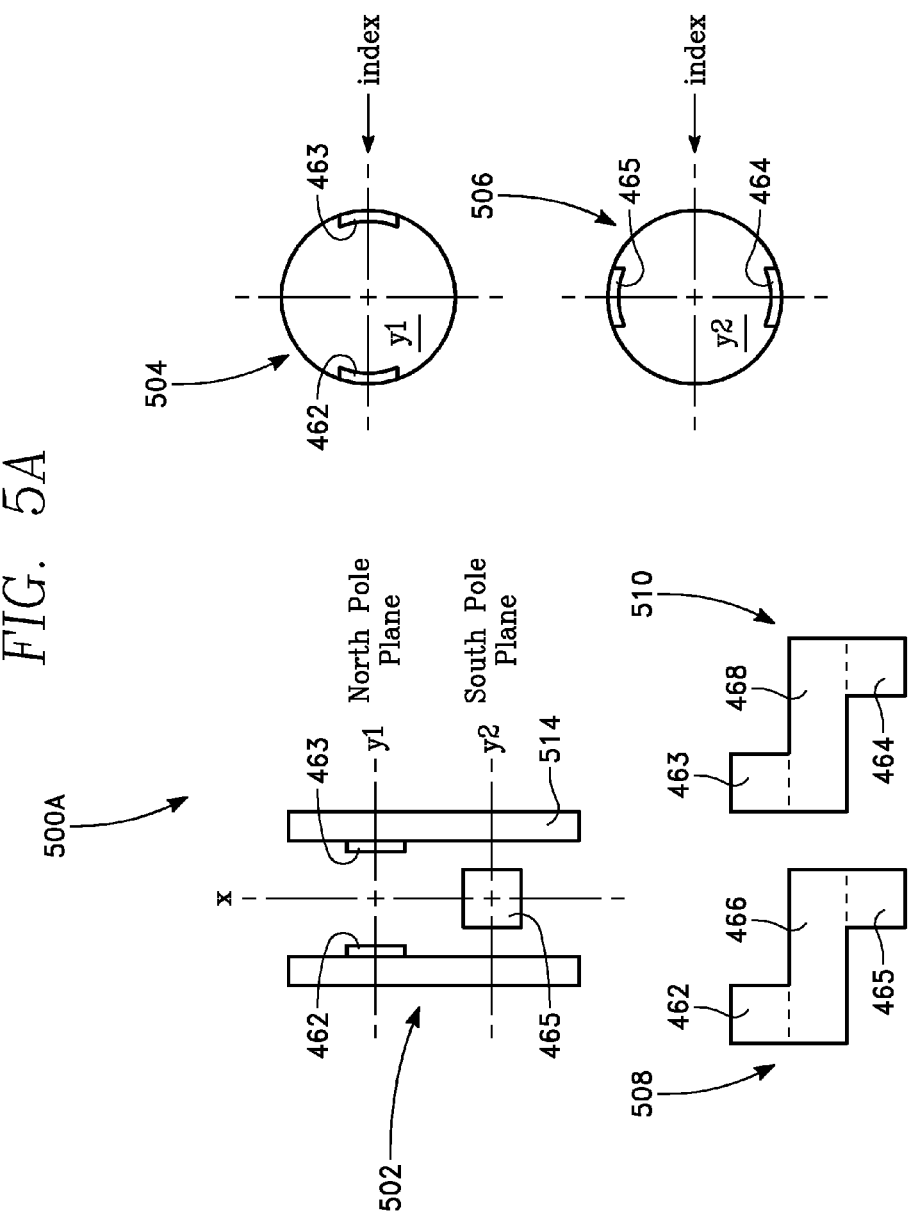
FIG. 5A shows rotor poles of an electromechanical flywheel machine of FIG. 1.

FIG. 5A shows a radially staggered arrangement of rotor poles in adjacent pole planes for a 2+2 pole single stage homopolar machine 500A. Referring to rotor cross section 502 and rotor 514, a first pole 462 is located in a first pole plane Y1 and an opposed pole 463 in located in the same plane. In a similarly clocked adjacent pole plane Y2, an adjacent plane pole 465 is between the Y1 plane poles. Not shown in this cross section is the second pole in the Y2 plane 464.

The plane views 504, 506 of the pole planes Y1, Y2 show the poles in each pole plane 462, 463 and 464, 465 are separated by a 90° geometric angle. In this 4 pole embodiment, the poles are similarly separated by 90 electrical degrees.

In various embodiments, a magnetic path extends between adjacent staggered poles. For example, as shown in the pole assemblies 508, 510, magnetic path parts 466, 468 extend between pole pairs 462, 463 and 463, 464. As shown here, two continuous magnetic paths are formed in a 4 pole machine rotor by magnetic path parts 462-466-465 and 463-468-464. In some embodiments, each magnetic path part assembly 462-466-465 and 463-468-464 is "Z" shaped with the central members 466, 468 meeting adjoining members 462, 465 and 463, 464 at substantially right angles. Among other things, this structure preserves the capacity of the magnetic path.

Figure 5B:
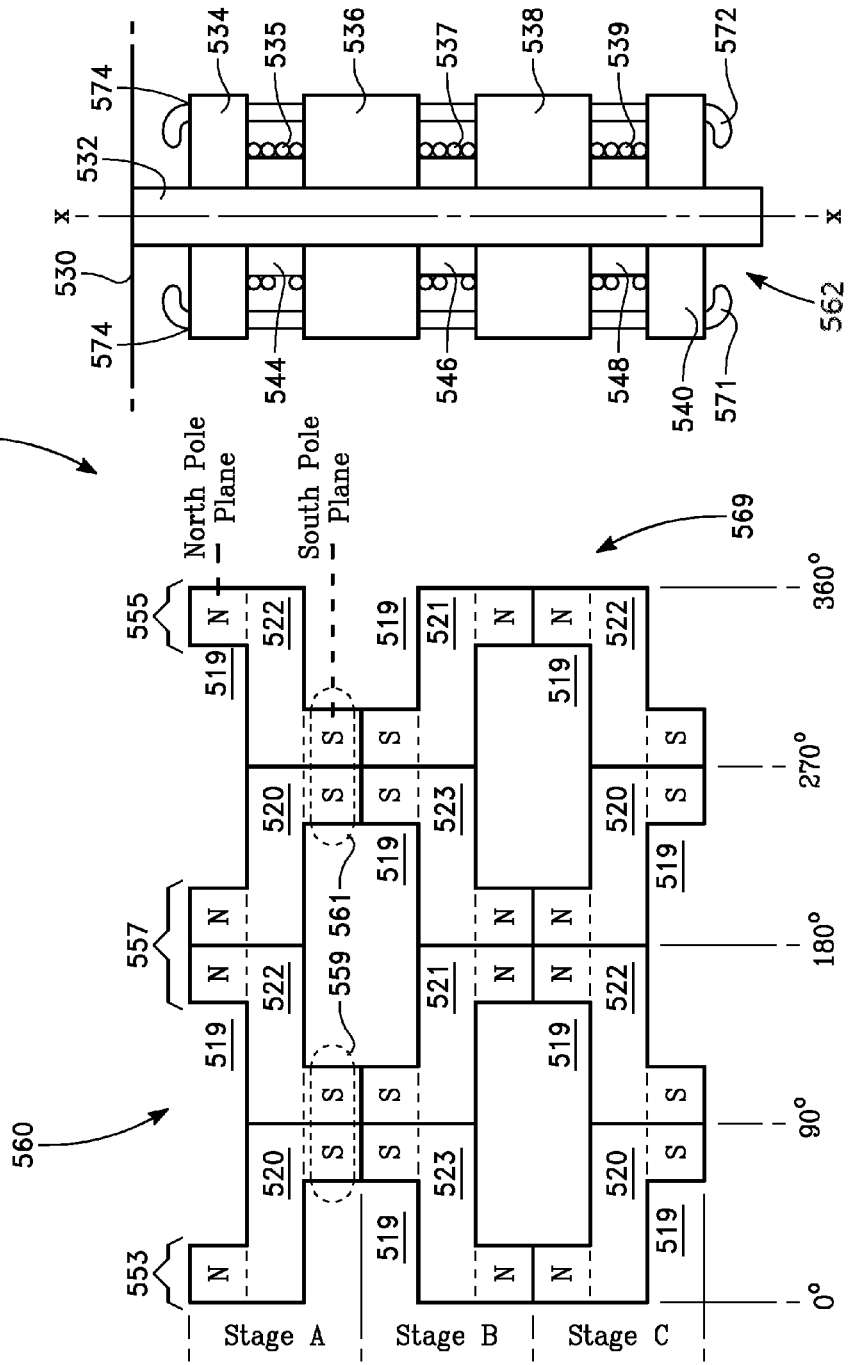
FIG. 5B shows rotor poles and a stator of an electromechanical flywheel machine of FIG. 1.

FIG. 5B shows a rotor and a stator for a three stage machine, each stage having four poles 500B. Here, a view of rotor magnetic path part assemblies 560 is shown as if the normally cylindrical rotor structure is "unrolled" such that a planar surface is presented. The magnetic path part assemblies 520, 522, 523, 521 are arranged to create a lattice 569 with spaces between the parts 519, the spaces being filled, in various embodiments, with non-magnetic material(s).

The lattice 569 is constructed such that a plurality of stages A, B, C is formed, each stage having 4 poles. For example, stage A has a North plane with a first full pole 557 and a second pole consisting of two half-poles 553, 555. Stage A also has a South plane with two full poles 559, 561. The North and South planes of Stage A therefore have a total of 4 complete poles.

Each stage includes four magnetic path part assemblies or rotor lattice parts. For example, Stage A includes magnetic path part assemblies 520, 522, 520, and 522; Stage B includes magnetic path part assemblies 523, 521, 523, and 521; and Stage C, like Stage A, includes magnetic path part assemblies 520, 522, 520 and 522. In some embodiments, the path part assembly geometry differs primarily in part orientation when curvature is not considered. Here, for example, assembly 520 differs from assembly 522 by an 180° rotation about an axis parallel to the x-x axis, assembly 520 differs from assembly 523 by an 180° rotation about an axis perpendicular to the x-x axis, and assembly 522 differs from assembly 521 by an 180° rotation about an axis perpendicular to the x-x axis.

Also shown is a cross sectional view of a stator 562. As seen, the stator has large 534, 536, 538, 540 and small 544, 546, 548 diameter rims centered on an x-x axis. First and second large diameter intermediate rims 536, 538 are interposed between large diameter peripheral rims 534, 540. One small diameter rim is interposed between each pair of large diameter rims such that the rims are stacked in an order 534, 544, 536, 546, 538, 548, and 540. The rims are supported by a coupled stator support 532 that is supported via a wall 530.

A plurality of armature windings eg . . . 571, 572 interengage a plurality of the large diameter rim peripheries eg . . . 574 via slots or a similar feature. Field windings 535, 537, 539 encircle the stator axis of rotation x-x with one field winding encircling each of the small diameter rims such that each field winding is between a pair of large diameter rims.

As can be seen, the lattice structure of the rotor 569 is arranged such that the first rim of the stator 534 corresponds to the North poles of stage A; the third rim of the stator 536 corresponds to the South poles of stage A and the South poles of stage B; the fifth rim of the stator corresponds to the North poles of stage B and the North poles of stage C; and, the seventh rim of the stator corresponds to the South poles of stage C.

In various embodiments, bearings are used to support the spinning assembly and the included flywheel mass 116, 316, 416. Any combination of the bearings described herein that is sufficient to support the spinning assembly may be used.

Figure 6:
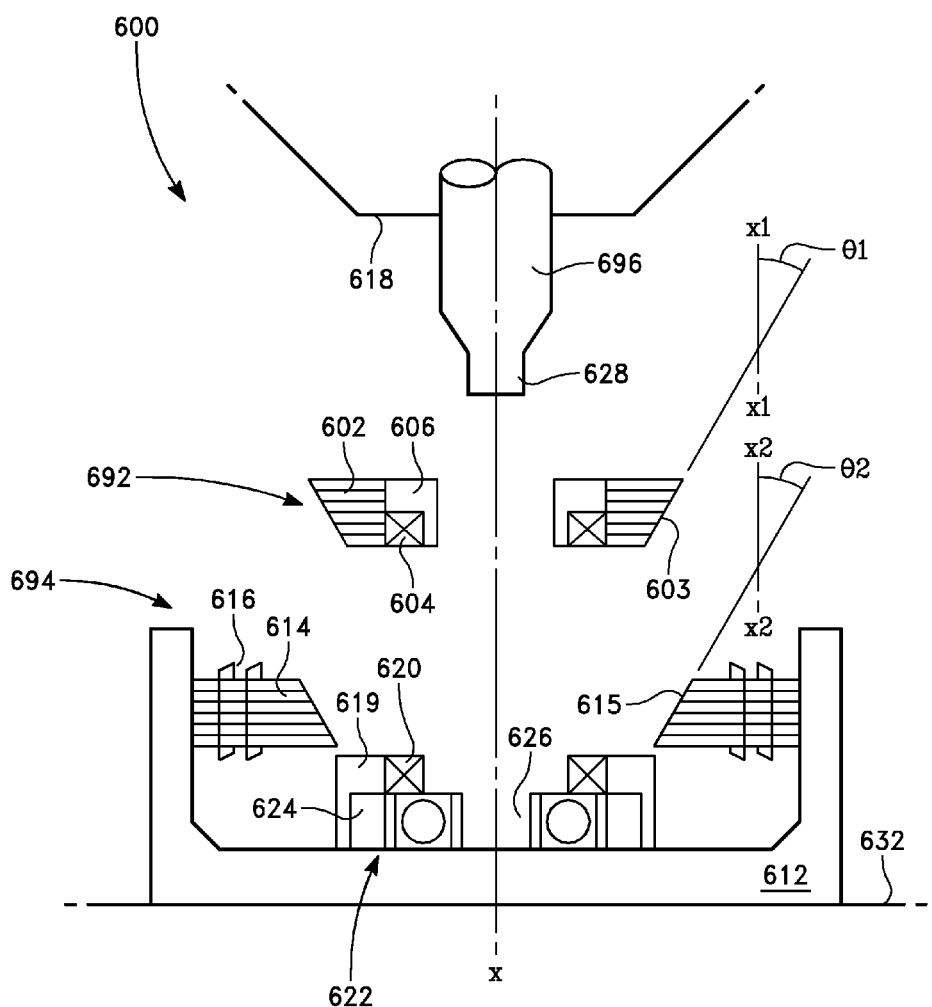
FIG. 6 shows a lower bearing assembly and parts of an electromechanical flywheel machine of FIG. 1.

FIG. 6 shows a lower bearing carrier and some related parts 600. As shown in the upper half of the drawing, there is a hub 618 for coupling to a flywheel mass, a support pin 696 for supporting the hub 618, a moving suspension assembly for supporting the hub 692, and a lower bearing carrier 694. The hub, support pin, and moving suspension assembly are fixedly coupled together (shown in FIG. 6 in exploded diagram format for clarity).

In various embodiments, the moving suspension assembly 692 includes a moving suspension assembly electromagnetic bearing rotor 602. In some embodiments, the bearing rotor is a laminated structure (as shown). In some embodiments, the bearing has a moving suspension assembly electromagnetic bearing face 603 oriented at an angle $\theta 1=0°$ where the angle is defined by the face and an axis x1-x1 parallel to the x-x axis. And, in some embodiments, the bearing has a face 603 oriented at an angle $0<\theta 1<90°$ ("angled face") (as shown) providing electromagnetic bearing force components parallel to the x-x axis and parallel to an axis perpendicular to the x-x axis.

In various embodiments, the moving suspension assembly 692 includes a moving suspension assembly permanent magnet 604 and in some embodiments the permanent magnet is in addition to the electromagnetic bearing rotor 602. And, in some embodiments, a moving suspension assembly magnet holder 606 provides a holder for either or both of the moving suspension assembly electromagnetic bearing rotor and the moving suspension assembly permanent magnet.

When the moving suspension assembly includes an electromagnetic bearing rotor 602, the lower bearing carrier 694 includes a corresponding lower bearing carrier electromagnetic bearing stator 614 and a lower bearing carrier stator electrical coil 616 for magnetizing the stator. The stator is supported by a lower bearing carrier frame 612 which is in turn supported by a housing wall 632.

In some embodiments, the bearing stator is a laminated structure (as shown). In some embodiments, the bearing has a lower bearing carrier electromagnetic bearing face 615 oriented at an angle $\theta 2=0°$ where the angle is defined by the face and an axis x2-x2 parallel to the x-x axis. And, in some embodiments, the bearing has a face 615 oriented at an angle $0<\theta 2<90°$ ("angled face") (as shown) providing electromagnetic bearing magnetic force components parallel to the x-x axis and parallel to an axis perpendicular to the x-x axis. As will be appreciated by persons of ordinary skill in the art, the bearing faces 603, 615 interoperate such that a straight rotor face is matched with a straight stator face while an angled rotor face is matched with an angled rotor face.

Where a moving suspension assembly permanent magnet is used 604, the lower bearing carrier includes a geometrically opposed permanent magnet 620. In some embodiments a lower bearing carrier permanent magnet holder 619 supported from the lower bearing carrier frame 612 and supporting the permanent magnet.

In various embodiments, the lower bearing carrier 694 includes a lower bearing carrier landing bearing such as an antifriction bearing 622. As shown, the landing bearing is supported from the lower bearing carrier frame 612. In some embodiments, a damping material 624 provides a seating material for the landing bearing.

Figure 7:
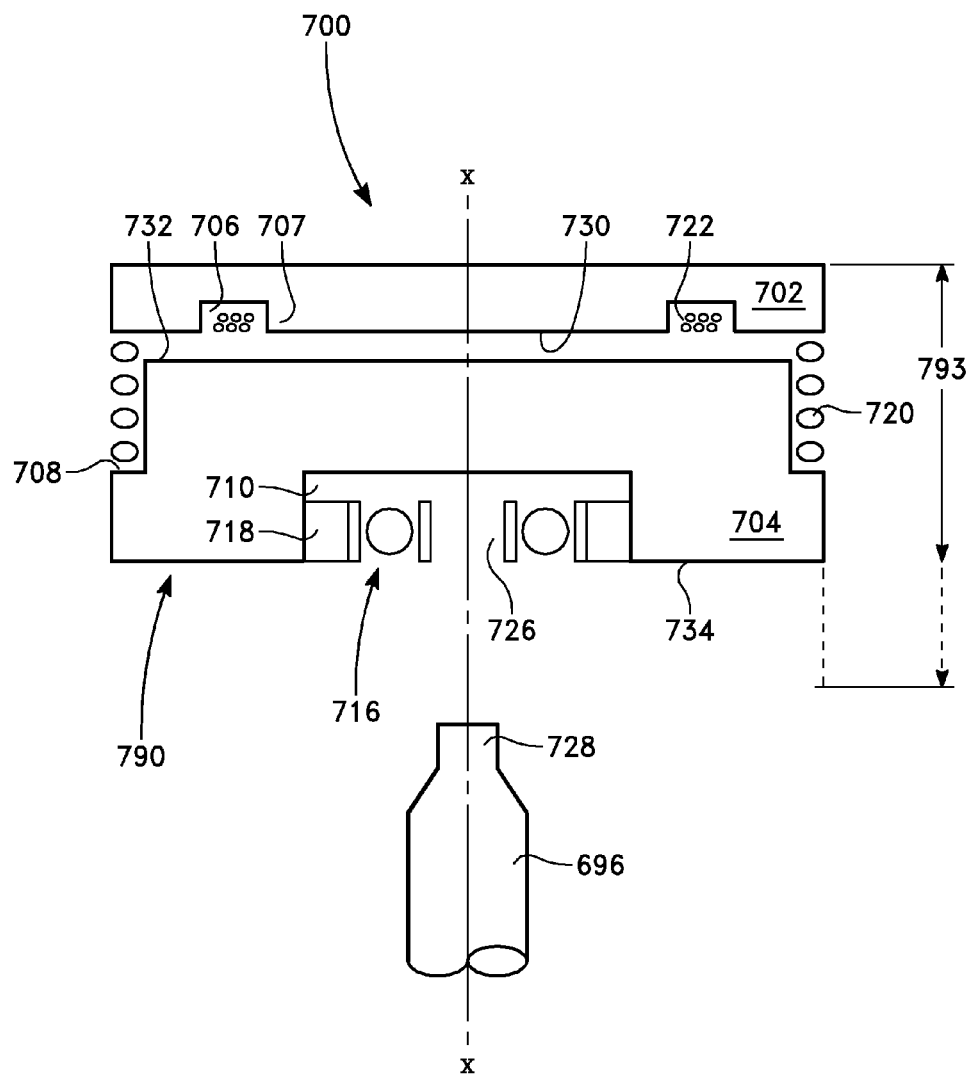
FIG. 7 shows an upper bearing assembly and parts of an electromechanical flywheel machine of FIG. 1.

FIG. 7 shows an upper bearing carrier and some related parts 700. As shown, the upper bearing carrier 790 includes a stationary plate 702 and a moving plate 704.

The stationery plate 702 includes a coil space 706 in the form of a groove is on a side of the stationery plate facing the moving plate 730. An electrical coil 722 for magnetizing a magnetic material surrounded by the coil 707 is included.

The moving plate 704 includes a spring space 708 and a mechanical bearing space 710. The spring space 708 is formed where a reduced diameter section of the moving plate extends to the side of the plate facing the stationery plate 732 and a spring such as a coil spring 720 occupies this space. The bearing space 710 is a central cavity in a moving plate surface 734 opposite the moving plate surface facing the stationery plate 732. As seen, operation of this electromagnet compresses the spring and tends to draw the plates together.

In various embodiments, the upper bearing carrier 790 includes an upper bearing carrier landing bearing such as an antifriction bearing 716. As shown, the landing bearing is positioned in the moving plate cavity 710. In some embodiments, a damping material 718 provides a seating material for the landing bearing.

As seen in FIGS. 6 and 7, the support pin 696 extends between the upper bearing carrier 790 and the lower bearing carrier 694. Further, each of the upper bearing carrier landing bearing 716, support pin 696, moving suspension assembly 692, lower electromagnetic bearing stator 614, lower bearing carrier permanent magnet 620, and lower bearing carrier landing bearing 622 is centered on the x-x axis such that when the moving plate 704 moves toward the lower bearing carrier 793, the support pin upper and lower ends 728, 628 are engaged with respective upper and lower landing bearings 716, 622 and a central aperture of each landing bearing 726, 626.

FIG. 8 shows another embodiment of an electromechanical flywheel 800. A flywheel mass 831 surrounds and is coupled to a homopolar motor-generator rotor including a metallic liner 830. As shown, the rotor includes rotor North rotor poles 824, 832. Not shown are the South rotor poles; see stages A and B of FIG. 5B for a similar arrangement that locates the South rotor poles.

A stator support 811 is coupled to a motor-generator stator 828 and each of field windings 826 and armature windings 820 are interengaged with the stator in a manner similar to that described above.

Supporting the rotor 830 and flywheel mass 831 is a hub 846 that is in turn supported by a support pin 864 engaging and/or located between upper and lower bearing carriers 860, 862. See FIGS. 6 and 7 for details of similar bearing carriers. A first electromagnetic bearing 866 is located in the lower bearing carrier. A second electromagnetic bearing 870 is spaced apart from the first and second bearing carriers and includes a bearing stator 818, a bearing rotor 818 and stator coils 814 for magnetizing the stator.

An electromechanical flywheel housing includes an inner vacuum barrier 812. In some embodiments, an outer housing 807 supports the vacuum barrier. Suitable vacuum barrier materials include stainless steel and other materials known by skilled artisans to be suited to this purpose.

In various embodiments, the stator support 811 has a tubular structure and a coaxial tube 801 is located therein. As shown, the coaxial tube envelops a liquid coolant flow entering the stator support 802 and an annulus between the support structure inside diameter and the coaxial tube outside diameter 815 provides a flow path for coolant leaving the stator support 803. Coolant traveling through the annulus absorbs heat from the stator 828 and is in various embodiments cooled in a cooler (not shown) before it is pumped (not shown) back into the flow entry 802.

Heat pipes 808 provide stator cooling in some embodiments. As shown, each of a plurality of heat pipes has a heat absorbing first end in close proximity to the stator, such as in the stator armature winding slots (as shown) 872. The heat rejecting end of the heat pipe is in close proximity to the vacuum barrier, such as in contact with vacuum barrier (as shown) 874 or in other embodiments cooled by the above mentioned liquid coolant flow.

As discussed in connection with FIG. 4A and FIG. 4B, a drag pump utilizes stationery and moving surfaces operating in close proximity. As shown in FIG. 8, an inner axial drag pump is formed by a labyrinth similar to those described above and coupled to peripheral stator parts such as the large diameter stator rings 824, 828, 832 or fixed to geometrically opposed rotor poles 824, 828, 832. For example, where the labyrinth is coupled to the stator, an adjacent moving surface is provided by the opposed rotor poles that move with the flywheel mass 831.

Embodiments of the evacuation system described above, including embodiments discussed in connection with FIG. 4 and FIG. 8, are augmented with gas removal trains with pumps. The gas removal trains are external to the vacuum barrier housing 428. For example one or more pumps can be arranged in series or in parallel to take suction from a vacuum barrier housing exhaust port 489 in fluid communication with the vacuum barrier housing exhaust region 487.

Figure 9A:
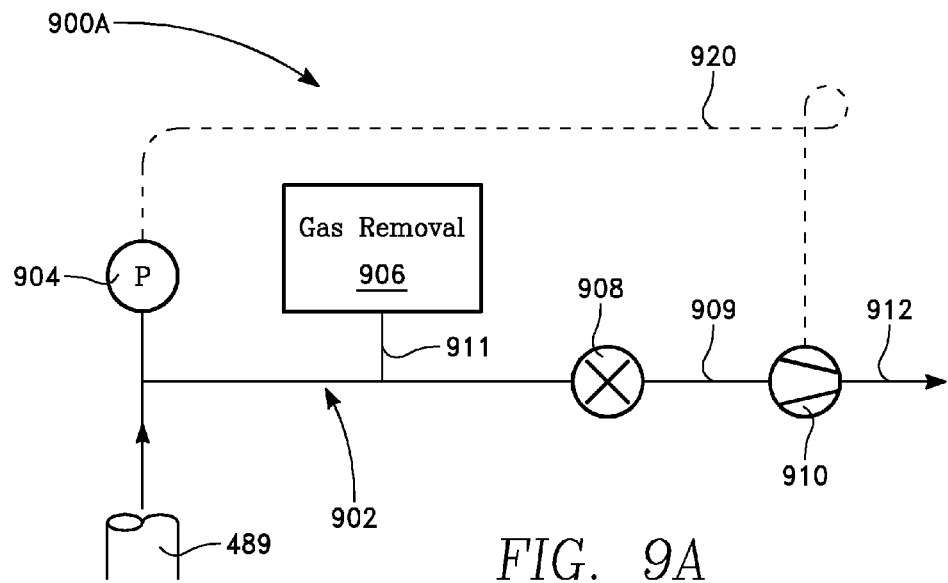
FIGS. 9A and 9B show a first external pumping system of the electromechanical flywheel machine of FIG. 1.

FIG. 9A shows a first external pumping system with a branch gas removal device 900A. A manifold 902 and a branch 911 fluidly couple the exhaust port 489 with a gas removal device 906. A pumping system valve 908 is fluidly coupled to a mechanical vacuum pump 910 by a passageway 909. The pumping system valve provides manifold isolation from a downstream connection or vent 912. In various embodiments, a mechanical vacuum pump 910 is located downstream of the isolation valve. And, in some embodiments, a pressure sensor 904 is provided for manual viewing and/or automated operation. For example, a pressure feedback signal and/or controller 920 are used in some embodiments to operate the vacuum pump 910 when the sensed pressure is higher than a threshold vacuum level.

Figure 9B:
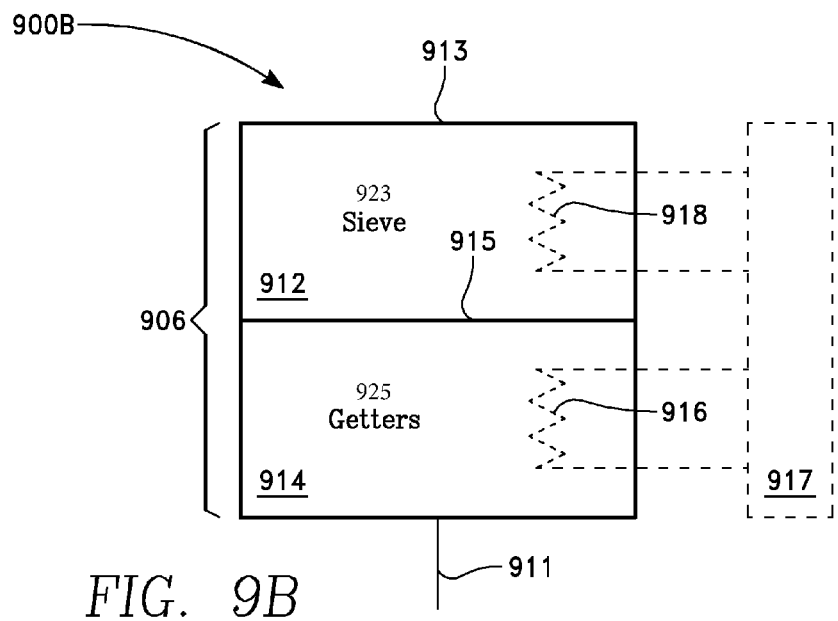

FIG. 9B shows a first gas removal device 900B. Embodiments of the gas removal device 906 include a housing or casing 913 with multiple chambers 912, 914 holding a plurality of pumps. In various embodiments, a gas removal device inlet 911 provides access to a getter type pump 925 in a first chamber that is separated from a sieve type pump 923 in a second chamber, the chambers being separated by a gas permeable structure 915 such as a perforated wall.

As is further discussed below, heating getter and sieve materials provides for enhanced activity and/or regeneration. An optional getter heater 916 and/or an optional sieve heater 918 with a corresponding control(s) and/or power supply(s) 917 provides this functionality. In some embodiments, the control 917 receives feedback from the pressure sensor 904 such that heater operation is a function of and/or influenced by pressure sensor measurements.

Flywheel machines with composite flywheel masses often evolve gasses including primarily water vapor and to a lesser extent hydrocarbons and other active gasses. Molecular sieves typically provide a majority of water vapor removal while getters typically provide a majority of active gas removal.

As persons of ordinary skill in the art will understand, getters provide for removal of gasses and in particular for removal of many active and inactive gasses other than water vapor. A getter is a deposit of reactive material placed inside a vacuum system, for completing and maintaining the vacuum. Gas molecules that strike the getter material combine with it chemically or by adsorption.

In flywheel systems designed to be exposed to air during maintenance, nonevaporative getters provide a getter pump solution. These getters work at high temperature and often consist of or include a special alloy such as zirconium. A desirable feature is that the alloy material(s) form a passivation layer at room temperature which disappears when heated. Common alloys have names of the form St (Stabil) followed by a number: St 707 is 70% zirconium, 4.6% vanadium and the balance iron, St 787 is 80.8% zirconium, 14.2% cobalt and balance mischmetal, St 101 is 84% zirconium and 16% aluminium. Heating these getter materials typically enhances their activity so they should not be heated if the system is not already in a good vacuum.

Sieves and in particular molecular sieves incorporate a material containing tiny pores of a precise and uniform size that is used as an adsorbent for gases and liquids. Molecules small enough to pass through the pores are adsorbed while larger molecules are not. It is different from a common filter in that it operates on a molecular level and traps the adsorbed substance. For instance, a water molecule may be small enough to pass through the pores while larger molecules are not, so water is forced into the pores which act as a trap for the penetrating water molecules, which are retained within the pores. Because of this, they often function as a desiccant. Often they consist of aluminosilicate minerals, clays, porous glasses, microporous charcoals, zeolites, active carbons, or synthetic compounds that have open structures through which small molecules, such as nitrogen and water can diffuse. Calcium oxide is a frequently used dessicant material.

Methods for regeneration of molecular sieves include heating under high vacuum. Temperatures typically used to regenerate water-adsorbed molecular sieves range from 130° C. to 250° C. Additional information on pumps including mechanical vacuum pumps, getter pumps, and sieve pumps can be found in U.S. Pat. No. 6,884,039 to Woodard et al.

Figure 9C:
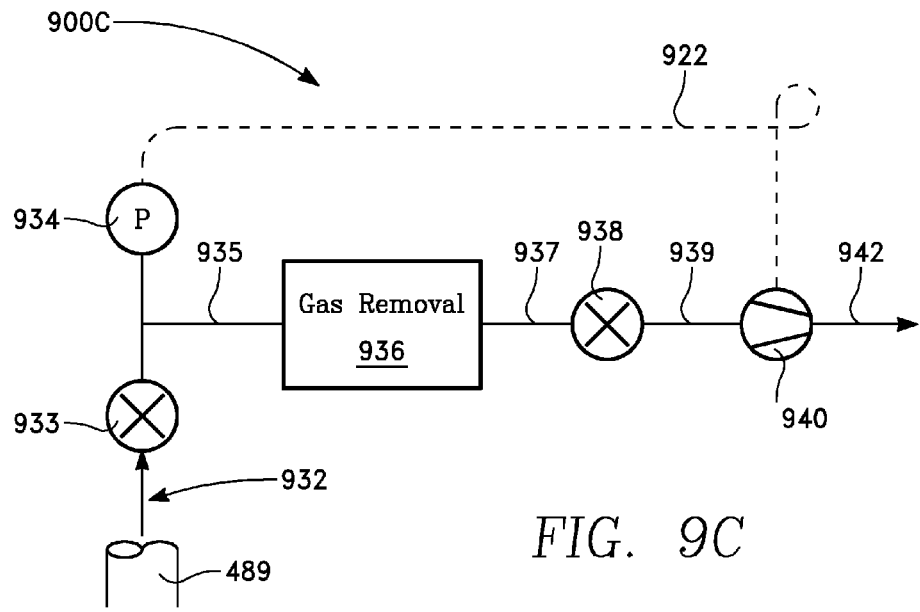
FIGS. 9C and 9D show a second external pumping system of the electromechanical flywheel machine of FIG. 1.

FIG. 9C shows a second external pumping system with an in-line gas removal system 900C. A manifold 932 fluidly couples the exhaust port 489 with a first isolation valve 933 and a first passageway 935 couples the valve and a gas removal device 936. In the first passageway and downstream of the isolation valve is a pressure sensor 934. A mechanical vacuum pump 940 provides suction to the gas removal device via a second isolation valve 938 that is coupled therebetween via second and third passageways 937, 939. A mechanical vacuum pump exhaust is coupled to a connection or vented 942. In various embodiments, the pressure sensor 934 is provided for manual viewing and/or automated operation via a pressure feedback signal and/or controller 922 for operating the vacuum pump. For example, a pressure feedback signal and/or controller 922 are used in some embodiments to operate the vacuum pump 940 when the sensed pressure is higher than a vacuum pressure threshold level.

Figure 9D:
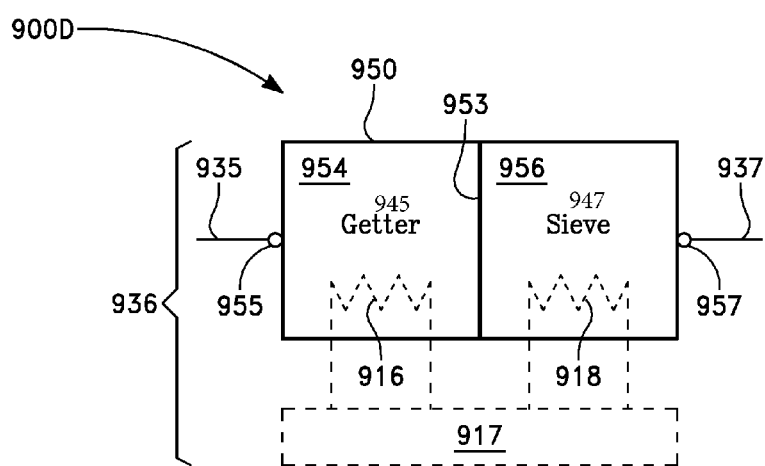

FIG. 9D shows a second gas removal device 900D. Embodiments of the gas removal device 936 include a housing 950 with multiple chambers 954, 956 holding a plurality of pumps. In various embodiments, a gas removal device inlet 955 provides access to a getter type pump 947 in a first chamber. The first chamber is separated from a sieve type pump 945 in a second chamber, the chambers being separated by a permeable structure 953 such as a perforated wall. Gas therefore enters through the getter chamber 954 and exits, via a gas removal device outlet 957, after crossing the permeable structure and sieve chamber.

An optional getter heater 916 and/or an optional sieve heater 918 with a corresponding control(s) and/or power supply(s) 917 provides this functionality. In some embodiments, the control 917 receives feedback from the pressure sensor 934.

Figure 9E:
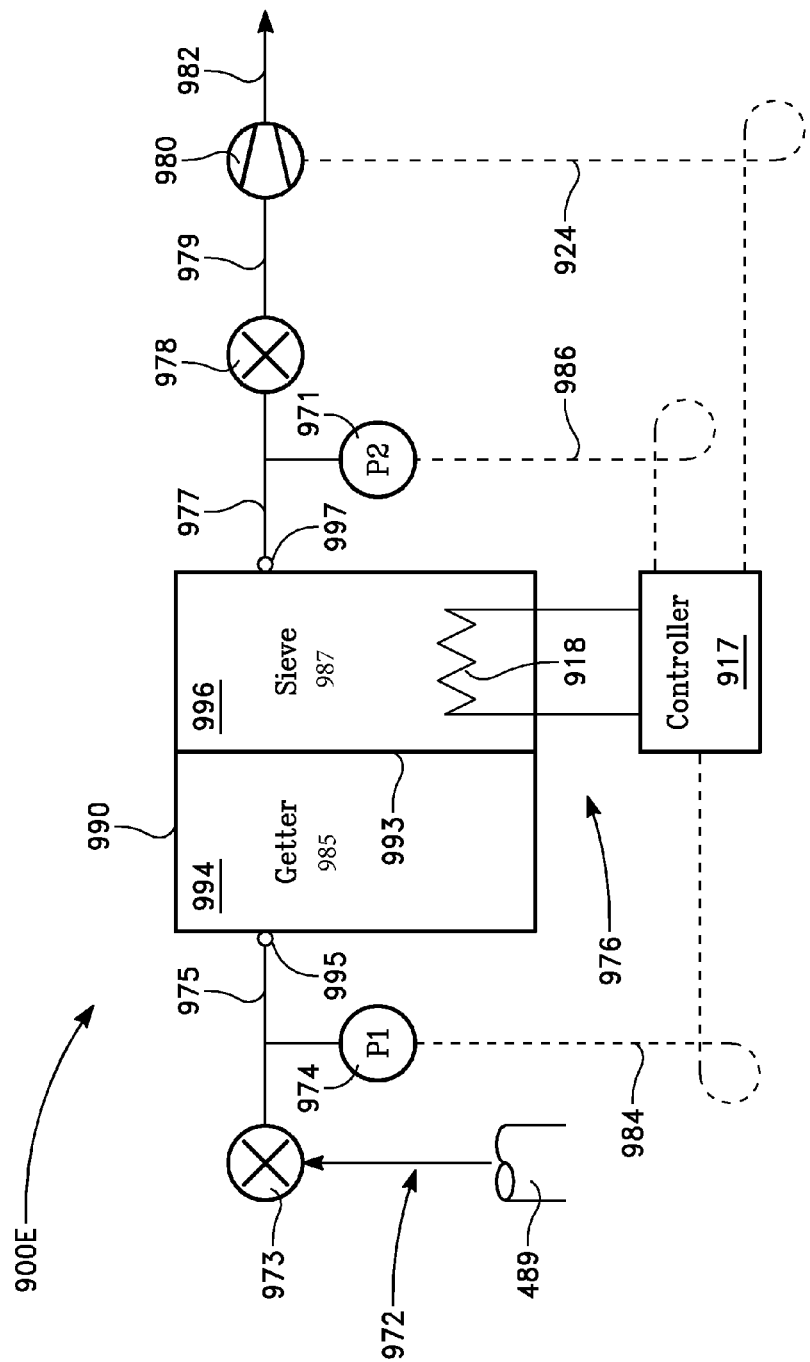
FIG. 9E shows a third external pumping system of the electromechanical flywheel machine of FIG. 1.

FIG. 9E shows a third external pumping system with an in-line gas removal system 900E. A manifold 972 fluidly couples the exhaust port 489 with a first isolation valve 973 and a first passageway 975 couples the valve and a gas removal device 976. A mechanical vacuum pump 980 provides suction to the gas removal device via a second isolation valve 978 that is coupled therebetween via second and third passageways 977, 979. A second pressure sensor 971 is fluidly coupled to the second passageway and a mechanical vacuum pump exhaust is coupled to a connection or vented 982.

A first signal line 984 couples the first pressure sensor 974 and a controller 917. A second signal line 986 couples the second pressure sensor 971 and the controller. A third signal line 924 couples the controller and the mechanical vacuum pump. In various embodiments, a pressure sensor signal, such as a signal from the first pressure sensor 984, is provided to the controller 917 and a controller control signal 924 is provided in turn for operating the mechanical vacuum pump when the sensed pressure exceeds a threshold vacuum pressure.

Embodiments of the gas removal device 976 include a housing 990 with multiple chambers 994, 996 holding a plurality of pumps. In various embodiments, a gas removal device inlet 995 provides access to a getter type pump 985 in a first chamber. The first chamber is separated from a sieve type pump 987 in a second chamber, the chambers being separated by a permeable structure 993 such as a perforated wall. Gas therefore enters through the getter chamber 994 and exits, via a gas removal device outlet 997, after crossing the permeable structure and sieve chamber.

A sieve heater 918 with a corresponding control and power supply 917 provides this functionality in accordance with feedback from each of the pressure sensors 974 and 971.

Notably, either of the pressure sensors might be used to sense a pressure at the exhaust port 489 while isolation valve 973 is open. In some embodiments, reversal of the position in the passageway 975 of the first pressure sensor 973 and isolation valve 973 provides for exhaust port pressure sensing irrespective of the isolation valve being open or closed. In addition to redundancy, an added benefit of having pressure sensors to either side of the gas removal device 976 is measuring pressure drop across this device. Pressure drop information can be used to influence sieve heater control operation, rising differential pressures indicating an increasing need to operate the heater.

While the above gas removal device heaters for sieves and getters are schematically depicted as heaters within a respective pump chamber, skilled artisans will appreciate that embodiments having external heaters such as coils wrapping around a chamber could also be used.

In various embodiments, initial evacuation of the vacuum barrier housing is followed by operation of a gas removal device 906, 936, 976 as described above. Rising pressure at the exhaust port 489 indicates leaks and/or outgassing of parts exposed to the vacuum. When the pressure rises to a vacuum threshold level determined by flywheel design parameters such as flywheel mass temperature limits, the mechanical vacuum pump is operated and the passageway coupling the pump and the exhaust port 489 is opened to evacuate the vacuum barrier housing 428.

In various embodiments, the sieve heater 918 is operated when one or more of rising exhaust port 489 pressure, sieve age, time since the last sieve regeneration, and operating time since the last sieve regeneration are used to signal sieve regeneration by operation of the sieve heater. Sieve regeneration typically requires blocking the exhaust port 489 with an isolation valve between the port and the gas removal device 906, 936, 976. When this is done, sieve regeneration is accomplished by heating the sieve and by operation of the mechanical vacuum pump while isolation valves interposed between the mechanical pump and the gas removal device are open.

In various embodiments, the getter heater 916 is operated to regenerate the getter in a manner similar to that described for the sieve heater above. And in various embodiments, the getter heater 916 is operated while the exhaust port 489 is in fluid communication with the getter because getter heating improves getter performance.

In operation, a flywheel mass of the electromechanical flywheel is accelerated by the motor-generator during flywheel charging. During charging, energy is transferred to the motor-generator. During discharge, the motor-generator converts the kinetic energy of the flywheel into electrical energy as the flywheel mass is decelerated. Power electronics provide for conversion of network electric power in order to motor the motor-generator and the mechanically coupled flywheel mass. Power electronics also provide for conversion of motor-generator generated electric power into a waveform suited for use by the electrical network to which the electric power is transferred.

While various embodiments of the present invention have been described above, it should be understood that they have been presented by way of example only, and not limitation. It will be apparent to those skilled in the art that various changes in the form and details can be made without departing from the spirit and scope of the invention. As such, the breadth and scope of the present invention should not be limited by the above-described exemplary embodiments, but should be defined only in accordance with the following claims and equivalents thereof.

What is claimed is:

1. An electromechanical flywheel comprising:
   a motor-generator rotor surrounding a motor-generator stator;
   a flywheel mass configured to rotate with the motor-generator rotor;
   the flywheel mass and the motor-generator rotor located inside an evacuable housing;
   a gas removal train external to the evacuable housing;
   the train including a mechanical vacuum pump and a non-mechanical gas removal device;
   getter material and molecular sieve material in a casing of the non-mechanical gas removal device;
   the train operable to fluidly couple the casing and the evacuable housing for lowering the pressure in the evacuable housing;
   a pressure sensor configured to sense the pressure in the evacuable housing; and,
   the mechanical pump configured to operate intermittently in accordance with differences between a pressure sensed by the pressure sensor and a threshold vacuum pressure level.

2. The electromechanical flywheel of claim 1 further comprising:
   a gas removal train flowpath extending between the evacuable housing and the mechanical vacuum pump; and,
   the casing in fluid communication with the flowpath via a single passageway.

3. The electromechanical flywheel of claim 2 further comprising:
   a gas permeable structure;
   the structure within the casing; and,
   the structure separating the getter material and the molecular sieve material.

4. The electromechanical flywheel of claim 1 further comprising:
   a gas removal train flowpath extending between the evacuable housing and the mechanical vacuum pump; and,
   the casing in fluid communication with the flowpath via first and second passageways.

5. The electromechanical flywheel of claim 4 further comprising:
   a casing inlet and a casing outlet;
   the casing inlet proximate the getter material;
   the casing outlet proximate the molecular sieve material; and,
   flow from the casing inlet to the casing outlet being urged by operation of the mechanical vacuum pump.

6. The electromechanical flywheel of claim 5 further comprising:
   a gas permeable structure;
   the structure within the casing; and,
   the structure separating the getter material and the molecular sieve material.

7. The electromechanical flywheel of claim 1 further comprising:
   a gas removal train flowpath extending between the evacuable housing and the mechanical vacuum pump;
   the casing in fluid communication with the flowpath via first and second passageways;
   a first pressure sensor sensing pressure between the evacuable housing and the non-mechanical gas removal device;
   a second pressure sensor sensing pressure between the non-mechanical gas removal device and the mechanical vacuum pump;
   a heater for heating the molecular sieve material; and, the heater configured to operate intermittently in accordance with differences between pressures sensed by the first and second pressure sensors as compared with a threshold pressure difference.

8. An electromechanical flywheel comprising:
a core assembly including a motor-generator stator;
a motor-generator rotor surrounding the motor-generator stator;
the motor-generator stator defining an axis of rotation, having a field coil that encircles the axis of rotation, and having an armature coil that does not encircle the axis of rotation;
a flywheel mass encircling the motor-generator rotor and coupled to the motor-generator rotor for rotation with the motor-generator rotor;
an evacuable housing enclosing the motor-generator rotor and the flywheel mass;
a gas removal train external to the evacuable housing;
the train including a mechanical vacuum pump and a non-mechanical gas removal device;
getter material and molecular sieve material in a casing of the non-mechanical gas removal device;
the train operable to fluidly couple the casing and the evacuable housing for lowering the pressure in the evacuable housing;
a pressure sensor configured to sense the pressure in the evacuable housing; and,
the mechanical pump configured to operate intermittently in accordance with differences between a pressure sensed by the pressure sensor and a threshold vacuum pressure level.

* * * * *